June 26, 1962 F. W. SIEVE ET AL 3,041,017
GUN–CATAPULT MECHANISM
Original Filed March 29, 1956 5 Sheets-Sheet 1

INVENTORS
Frank W. Sieve
Peter J. Olenick, Jr.
David C. Fowler

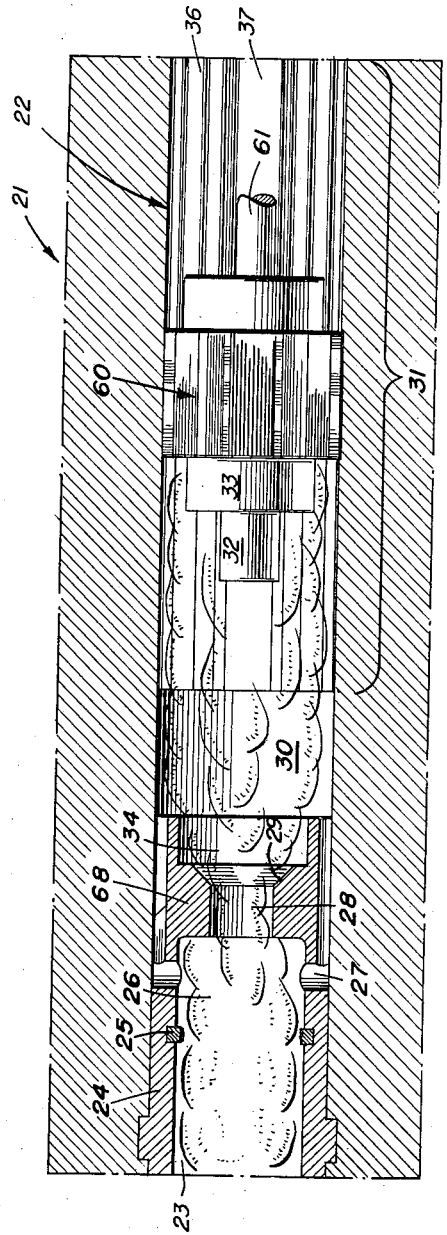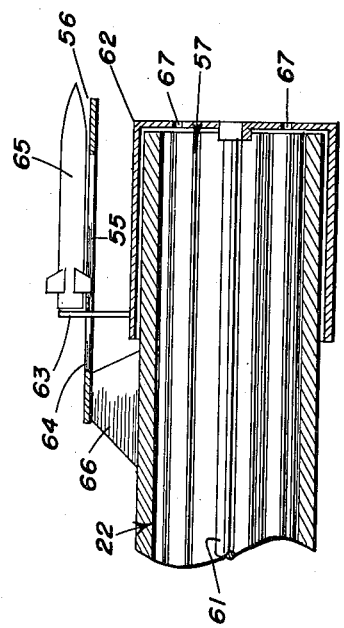

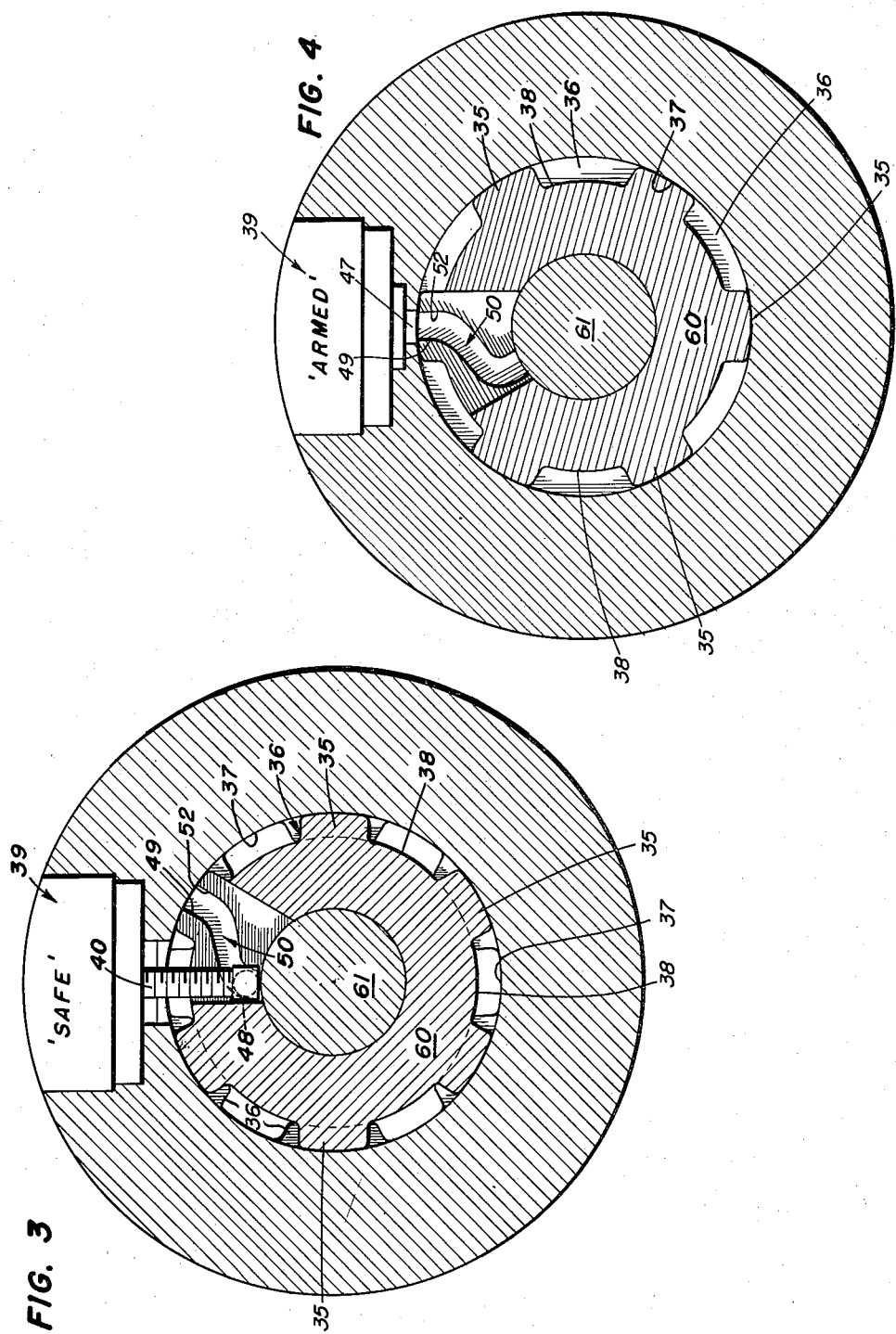

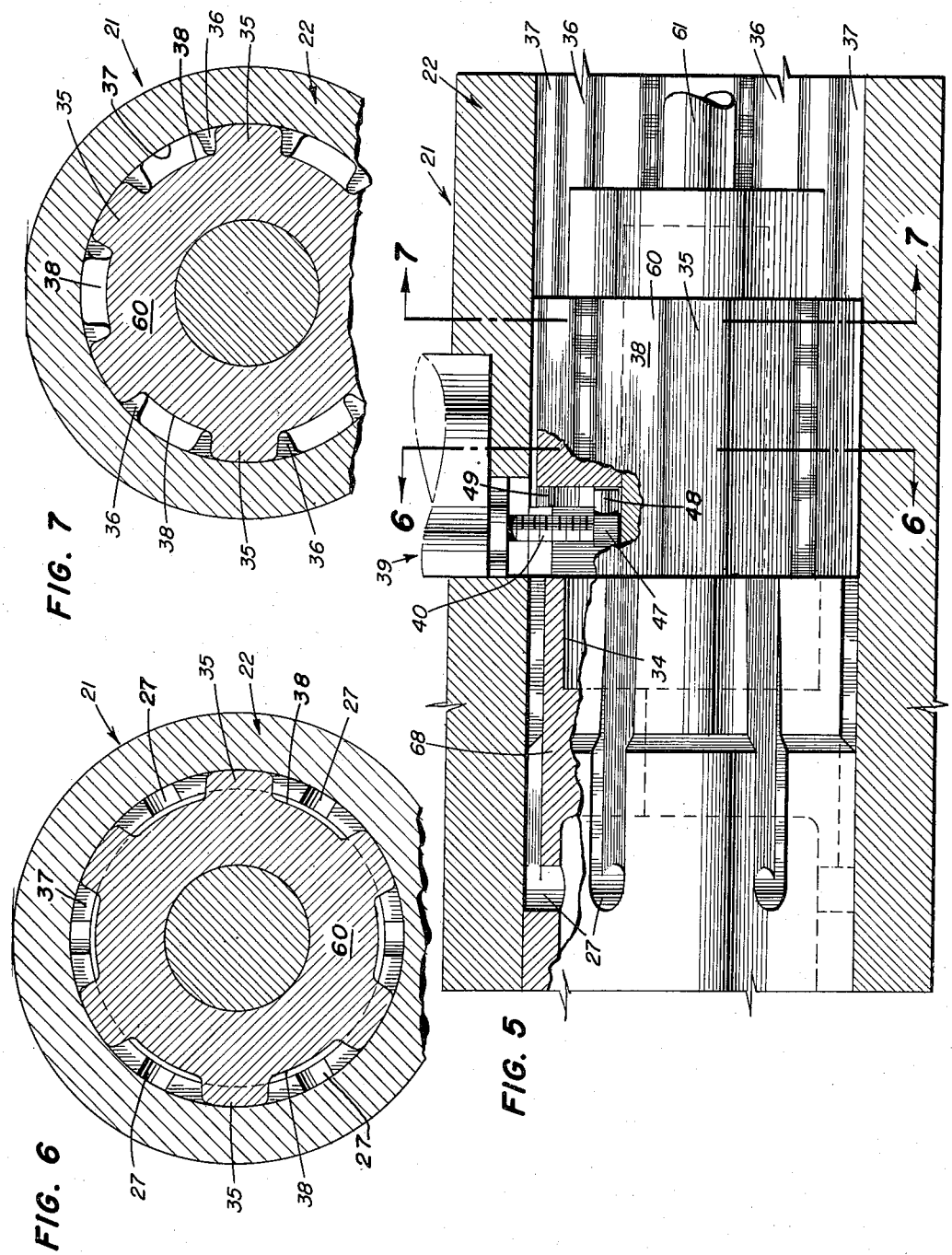

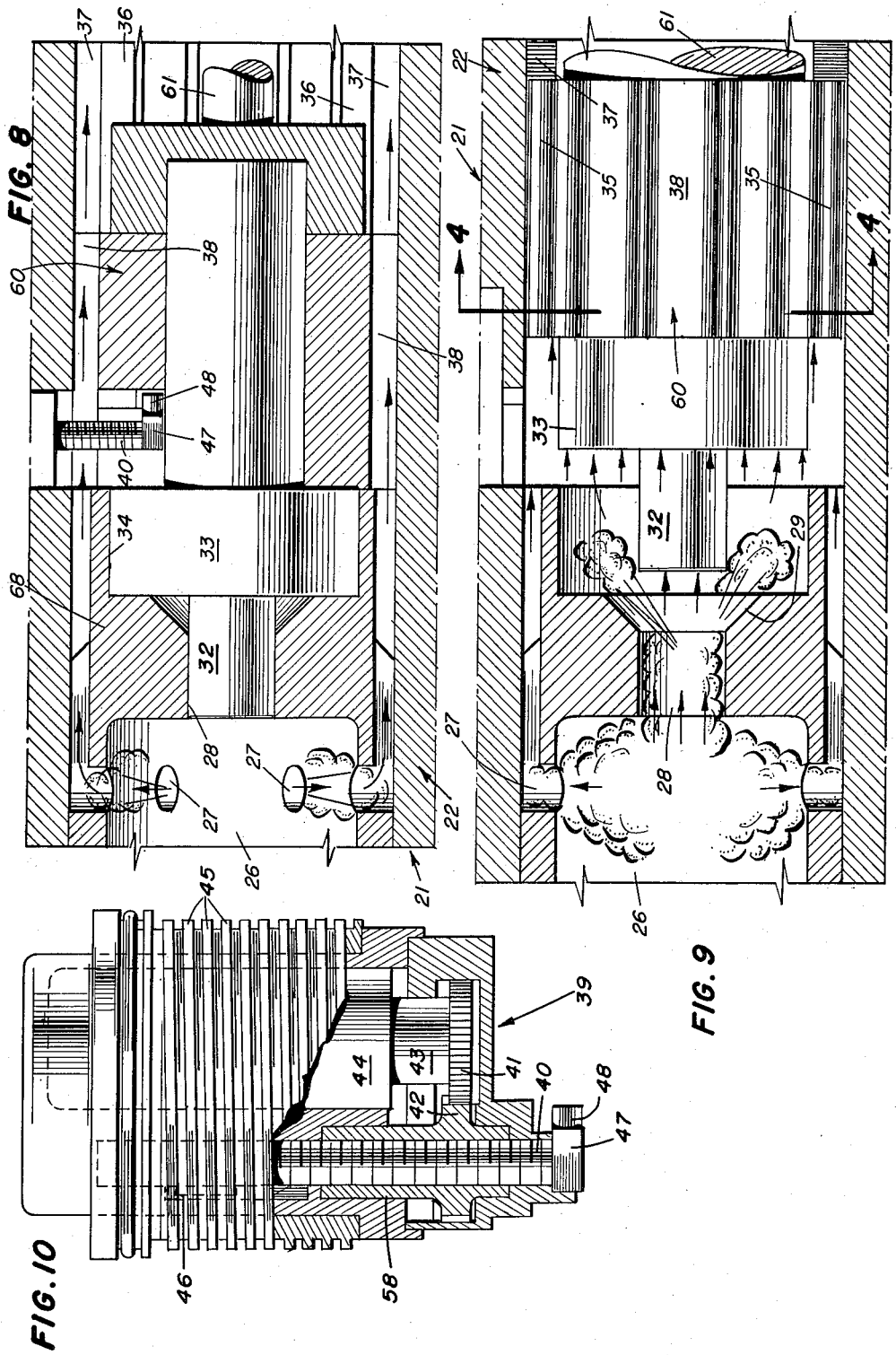

United States Patent Office 3,041,017
Patented June 26, 1962

3,041,017
GUN-CATAPULT MECHANISM
Frank W. Sieve, Falls Church, Va., Peter Joseph Olenick, Jr., Washington, D.C., and David Cleonis Fowler, Silver Spring, Md., assignors to the United States of America as represented by the Secretary of the Navy
Continuation of application Ser. No. 574,937, Mar. 29, 1956. This application May 29, 1956, Ser. No. 588,200
4 Claims. (Cl. 244—63)
(Granted under Title 35, U.S. Code (1952), sec. 266)

The invention described herein may be manufactured and used by or for the Government of the United States of America for governmental purposes without the payment of any royalties thereon or therefor.

The present application is a continuation of application Serial No. 574,937, filed March 29, 1956, for Gun Catapult Mechanism, and now abandoned.

The present invention relates to a gun-catapult mechanism and more particularly relates to high-low power drive apparatus for projecting a driver down a barrel while providing maximum safety to personnel and mechanism and maintaining maximum rigidity and strength with minimum weight and minimum necessary strength characteristics in the safety features.

Prior art guns and prior art catapults have the disadvantage of inherent danger to personnel, lack force multiplying features, casualties often occur to the equipment in use, facility is not lent to dual-purpose, and advantages of both rifling and ejectment without twist of the missile are not combined in the prior art devices.

The present invention overcomes these and other disadvantages of the prior art and provides for a gun-catapult mechanism with features of high-low force multiplication, safety, dual-purpose such that maximum efficiency of operation and safety are afforded and for an economical, accurate, and lightweight apparatus for performing the functions of the inventive device.

Accordingly, an object of the invention is to provide a gun-catapult mechanism which will incorporate features of force multiplication, safety, and simplicity of mechanical operation while retaining features of lightness of weight, accuracy and absolute reliability.

Another purpose of the invention is to provide a gun-catapult mechanism which will provide for features of high-low power drive operation.

Another aim of the invention is to provide safety apparatus for power drive mechanisms wherein a driver may be forced down a barrel in a manner to provide acceleration of the driver and to insure maximum reliability of operation when needed.

Another object of the invention is to provide for ejectment of a driver down a casing or barrel in a manner to provide both maximum driving and maximum catapult action combined with utmost safety and reliability in operation.

Another purpose of the invention is to provide for acceleration means to accelerate a propelled missile along a contoured container wherein an exploded charge may provide propelling force which propelling force is force multiplied and yet which will operate only at desired predetermined times and wherein the equipment will be of minimum weight, maximum economy, and will be provided with features of absolute safety, reliability in service, and avoid possibility of casualties causing injury to personnel and to the equipment.

Another object of the invention is to provide for a gun-catapult mechanism which will operate only when all parts are properly aligned and will have a safety mechanism which possesses maximum safety features, strength, and rigidity in all instances where accidental firing or ejectment is to be avoided.

Other objects and many of the attendant advantages of this invention will be readily appreciated as the same becomes better understood by reference to the following detailed description when considered in connection with the accompanying drawings wherein:

FIG. 2 is an elevational view of the apparatus of FIG. 1 with safety features omitted to lend clarity to the drawing and showing the spline driver in ejected position;

FIG. 3 is a cross-sectional view taken in the direction of the arrows 3—3 of FIG. 1;

FIG. 4 is a cross-sectional view taken in the direction of the arrows 4—4 of FIG. 9 and showing the mechanism of FIG. 3 upon rotation to armed position;

FIG. 5 is an enlarged side elevational view showing a portion of the device of FIG. 1 with further portions broken away to better illustrate the escape ports and actuator mechanism;

FIG. 6 is a cross-sectional view taken along the line 6—6 of FIG. 5 and showing alignment of grooves and escape ports;

FIG. 7 is a cross-sectional view taken along the line 7—7 of FIG. 5 and showing alignment of barrel and driver grooves;

FIG. 8 is a view similar to the showing in FIG. 5 illustrating in detail the escape path upon accidental explosion in safe position of the safety thread mechanism;

FIG. 9 is a side elevational view of a portion of the device of FIG. 1 with certain parts broken away to better illustrate high force action upon arming of the gun-catapult and commencing driving of the splined driver;

FIG. 10 is a cross-sectional view of an illustrative embodiment of the safety actuator of the present invention; and FIG. 11 is a diagrammatic view of one form of the catapult launching means of the inventive gun-catapult shown disposed at the forward extremity of the barrel.

Figure 1:
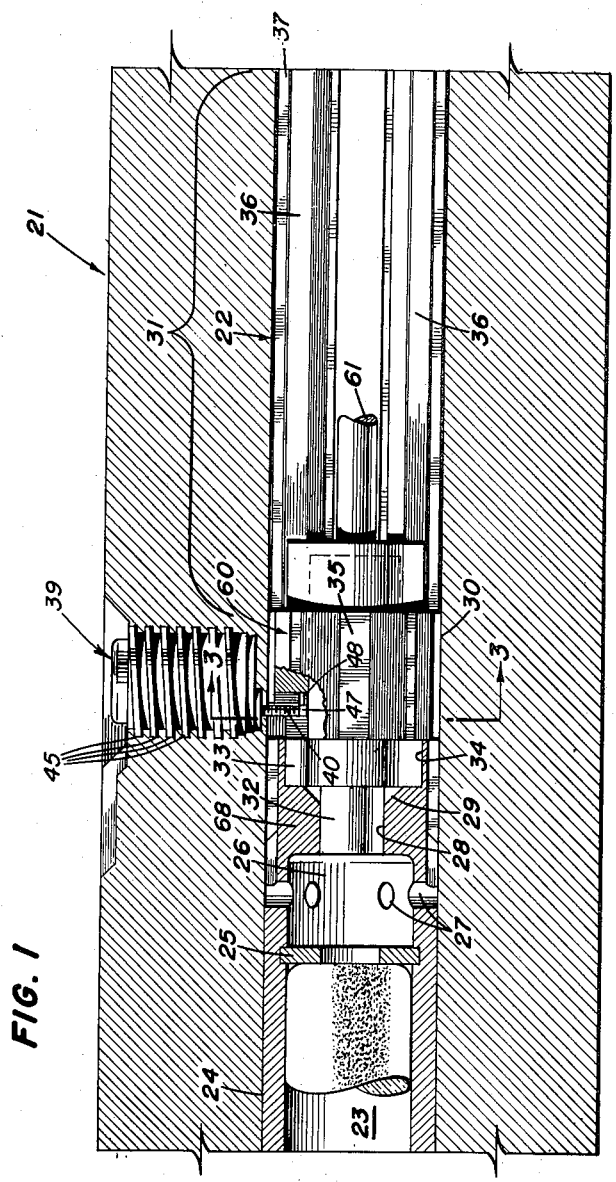
FIG. 1 is a side elevational view of a preferred embodiment of the casing and gun-catapult mechanism of the invention in safe position with parts broken away to better show certain features of the mechanism.

Referring more particularly to the drawings the gun-catapult of the present invention is shown in the illustrative embodiment generally at 21. A casing or barrel 22 is splined partially along its length for a purpose to be described. Toward the rearwardly disposed end of the barrel 22 an explosion chamber 23 may be contained in smooth bored section 24 of the casing or barrel 22. In this chamber may be placed an explosive charge (not numbered). Disposed forwardly of the explosion chamber 23 may be a frangible disk spacer member 25 designed to disintegrate upon explosion of the explosive material in explosion chamber 23. Forwardly of the frangible disk spacer 25 may be a normally unpressurized second explosion chamber 26. Upon explosion of the explosive material in explosion chamber 23 the shock or pressure will be transmitted to air or other gaseous particles in the second explosion chamber 26. Radially outward from pressure chamber 26 may extend escape ports 27 for a purpose to be described. Forwardly of the pressure chamber 26 may be a low piston chamber 28, a tapered wall chamber 29 and a high piston chamber 34. Disposed further forwardly of the piston chambers 28, 29, 34 may be an unsplined chamber 30 bored, undercut or otherwise machined in casing 22. Chambers 23, 26, 28, 29, 34 and the recess for disk 25 may be formed in barrel 22 by machining at the time of forming the barrel bore or as shown in FIG. 2 a liner or liners (not numbered) may be inserted in the unsplined portion of barrel 22 having inner contours to define these chambers. Chambers 28, 29 and 34 could also be formed by the bushing 68 as shown. In normal unfired condition disposed in the low piston chamber 28 is the low piston member 32, a taper portion (not numbered) is disposed in the tapered aperture and the high piston member 33 rigidly attached to or integral with the low piston member 32 is disposed in chamber 34. Disposed forwardly of high piston member 33 is a splined driver member 60 which in normal unfired position may abut against the piston member 33. From the forward end of splined driver 60 in unfired position to the open end of the casing 57 the casing or barrel 22 may be splined as best shown in FIGS. 1 and 2 of the drawings. The casing splines 36 may be in dimensional mating relationship with the grooves 38 between splines 35 of the splined driver 60. At the forward extremity of splined driver 60 when driver 60 is in unfired position is the start of casing spline members 36 which are disposed along casing 22 to the forward end 57 thereof. Alternating with the casing splines 36 are casing grooves 37, and grooves and splines may be equiangularly radially disposed with respect to the center of the casing and may be disposed adjacent the inner bored surface of the casing or barrel 22. Interposed between the splines 35 of splined driver 60 are the splined driver grooves 38.

As best shown in FIG. 10 an actuator generally designated at 39 may be screwed transversely and normally to the cylindrical portion of the gun barrel 22 by means of thread members 45. The gun barrel may have mating threads (not shown). Actuator assembly 39 may comprise a screw threaded pin 40 having a lower head 47 and a roller member 48. Screw threaded on safety pin 40 and disposed circumferentially therearound may be a rotatable sleeve member 58 having integrally or otherwise attached a driver gear member 42. Meshed with driver gear member 42 may be a pinion gear 41. Pinion gear 41 may be mounted on the output shaft 43 of a driver motor 44. Disposed along safety pin 40 may be a slot and retaining key assembly 46 so that upon rotation of motor 44 causing its output shaft 43 to rotate in turn causing pinion 41 to drive gear 42 the safety pin member 40 may be caused to advance or retard in accordance with the direction of rotation of output shaft 43 to plunge safety pin member 40 into and out of the casing or barrel 22. Plunging the safety pin member 40 into the casing 22 and splined driver 60 places the pin in engaged position. Motor 44 may be actuated by electrical signals, by remote control, by mechanical or hydraulic means, or otherwise in ways conventional in the art.

As best shown in FIG. 3 in safe position of the safety pin 40, roller 48 will be disposed in position at the inner end of a slot 50 such that splines 35 of splined driver 60 will be aligned directly behind the spline portions 36 of the splined portion 31 of casing or barrel 22. In this position the spline driver 60 is prevented from moving longitudinally with respect to the barrel or casing 22 because of the abutment stopping action of the splines 36 of portion 31 of the casing or barrel 22 upon splines 35 of spline driver 60 which are then in longitudinally aligned position. Upon retraction of safety pin member 40 and its roller member 48, roller member 48 will bear against cam surface 49 of slot 50 it being in close fitting relationship between the cam surfaces 49 and 52. This will cause rotation of the spline driver 60 such that it will assume the aligned position best shown in FIG. 4 of the drawings. When in such aligned position spline members 35 of splined driver 60 are in alternate spaced radial relation with respect to spline members 36 of portion 31 of the gun barrel, the spline members 35 are then longitudinally aligned with barrel grooves 37 and the splined driver 60 is free to travel longitudinally along the splined portion 31 of the barrel 22. Either integrally attached to or otherwise fastened to splined driver 60 may be a reduced shaft portion 61 which will travel with the splined driver 60. Attached to reduced shaft portion 61 may be a sleeve member 62 adapted to be bearingly fitted over barrel 22 to slide therealong for the length of travel of the splined driver 60 and supported reduced shaft portion 61. Rigidly attached to the sleeve member 62 may be extended a launching finger 63. Launching finger 63 may be disposed through a slot 55 in a platform 64 of the launcher generally designated at 56. Slot 55 may extend in platform 64 throughout the length of travel of launching finger 63 such that the launching finger may travel therealong a distance corresponding to the longitudinal displacement of reduced shaft portion 61 on firing. Launching finger 63 coincident with forward motion of reduced shaft 61 will catapult missile 65. Platform 64 may be supported by any supporting means conventional in the art as, for example, by cantilever support 66.

As best shown in FIG. 6 of the drawings when in safe unfired position of the driver the grooves 38 of splined driver 60 are in alignment with exit ports 27 of normally unagitated chamber 26 so that in the event of undesired explosion or premature explosion the gases will be expelled through the exit ports or escape ports 27 and through the driver grooves 38. As shown in FIG. 7 of the drawings in safe position of the driver the driver grooves 38 are aligned with the casing grooves 37 of casing or barrel 22 such that the gas will continue from the escape ports 27 through the driver grooves 38 thence along the grooves 37 of barrel 22 to escape through the forward end of the barrel. Appropriate escape apertures 67 may be provided at the end face of sleeve member 62 or alternatively through the side walls toward the forward end of barrel 22. These barrel escape ports may be disposed just before the rearward end of sleeve 62 if it is desired to have automatic retraction of the spline driver mechanism 60 in a manner to be presently described.

*Operation*

In safe, unused or unfired position as best shown in FIG. 1 explosion chamber 23, frangible disk spacer 25, empty chamber 26, low piston chamber 28 and high piston chamber 34 are in longitudinal alignment and in juxtaposition with abutting splined driver 60 and with reduced portion 61 which may be integral with the splined driver 60. In this position, low piston member 32 is disposed in low piston chamber 28 and high piston member 33 is disposed in high piston chamber 34. Actuator 39 as has been previously stated is threadedly inserted transversely of the gun barrel 22 and pin 40 is in locked position within the gun barrel 22 and splined driver 60 and as shown in FIG. 3 roller 48 by action with cam 49 has rotated the splined driver 60 in position such that the barrel grooves 37, the spline grooves 38 and the exit ports 27 are all aligned to permit ready flow of gas from the unagitated chamber 26 through the exit ports 27 through the grooves 38 of the splined driver 60 and thence through the barrel grooves 37 and out through the above-described exit ports at the forward end of the barrel. Should an unwanted explosion occur the pressure introduced into the gases present in chamber 26 will cause ejection of the gases through the exit ports 27 thereof and along the barrel 22 to be safely discharged. With the relatively small amount of force in this instance on the rearward face of low piston member 32 the safety pin 40 need be only of sufficient strength, rigidity and dimensions such that firing will not take place. The force exerted on the relatively small face area of low piston member 32 will not be of such magnitude due to the low area over which the pressure is applied to cause shearing of the safety pin 40, which pin therefore need only be of dimensions and material necessary to overcome the relatively small shear force exerted thereby. Upon decision to launch or fire, however, the motor 44 is actuated, as by remote control, electrical, electronic, or other means well-known to the art which causes its output shaft to rotate withdrawing the safety pin 40 in an upward direction out of the splined driver transversely with respect to gun casing 22. Roller 48 will then ride along cam surface 49 and between that cam surface and cam surface 52 resulting force of roller 48 applied to cam surface 49 causing rotation of the driver spline such that it assumes the armed position shown in FIG. 4 wherein the spline portions 35 of the splined driver 60 are aligned with the groove portions 37 of the splined section 31 of the casing 22 so that the splined driver is free to move along the casing 22 toward the forward end thereof and such that the ports 27 no longer lead into an open path for expanded gases out of the forward end of the barrel 22. The explosive charge 23 is then ignited causing spacer diaphragm 25 to disintegrate or to collapse and the chamber 26 then becomes filled with expanding gases. The expanding gases in chamber 26 cause pressure to be transmitted to the rearward face of low piston member 32 and to the rearward face of the splines of splined driver 60. Low piston member 32 then no longer being restrained by safety pin 40 commences to move forwardly of the gun casing bearing against the splined driver 60 to cause splined driver 60 to effect motion along the barrel 22 toward the forward end thereof. Upon motion of the low piston 32 and integral or rigidly attached high piston member 33 toward the forward end of the barrel 22 a chamber then exists behind the high piston rear end face causing pressure to be also exerted against the area therein which imparts the pressure over a total greater area causing an increase in force since $$\text{pressure} = \frac{\text{force}}{\text{area}}$$

and thereby accelerating the splined driver 60 along the barrel 22 a number of times which is a function of the total area of the high and low piston rear face surfaces plus the splined driver rear face surfaces as compared with the low piston rear face surface. The splined driver and its associated shaft 61 then may ride at an extremely rapid rate toward the forward end of the barrel 22. This imparts a rather large momentum to the shaft portion 61 which longitudinal motion may in turn be transmitted to the catapult mechanism. By means such as sleeve member 62 which may be attached or otherwise driven by the reduced shaft portion 61 the sleeve 62 may be caused to move in the direction of the forward end of the barrel 22 at a corresponding very rapid rate. Launching finger 63 which may be integrally or otherwise rigidly attached to the sleeve member 62 upon being projected therewith will cause catapulting action upon missile 65. Launching finger 63 may be mounted in a slot 65 disposed in platform member 64 which may serve to support the missile 65. Platform 64 may be supported as for example by means of cantilever support 66. Resulting action of this operation thereby causes catapulting by the sleeve member and additional gun barrel action may, if desired, be effected by motion transmitted through means of shaft portion 61 when the splined driver 60 is rapidly moved from a rearward position with respect to the barrel 22 to an extreme forward position toward end 57. After firing and launching which may be effected substantially simultaneously in the manner shown, return of the driver 60 and its associated sleeve portion 62 may be effected in various ways. For example, spring or other bias means (not shown) may serve to return the splined driver 60 and attached integrated parts and the high and low piston members 28 and 29 into non-firing position. Methods of recoil or counter-recoil may also be used, for example, one such system contemplated would embody a form wherein the end cylindrical wall of sleeve 62 would be solid and wherein through portholes in the gun casing disposed rearwardly of the sleeve the compressed gas upon flowing down the gun barrel would be emitted through ports occurring before the beginning of the sleeve portion at a certain sleeve position. In this manner compression of the gas disposed between the cylindrical end of sleeve 62 and the forward portion of the splined driver apparatus would take place. After the pressure is reduced in the after part of the chamber by leakage or by driving of the gas out of the portholes before sleeve 62, this pressure would then be below the pressure caused by compression of the gas trapped between the splined driver 60 and the end cylindrical wall of sleeve 62 thus causing a recoil action driving spline 62 toward its original non-fired position. Another method of accomplishing the recoil to restored initial conditions could be by means of electrical circuits or by means of a path of the expanding gases through the casing wall and into the space between the splined driver and the end wall of sleeve 62 timed such that upon the end of the stroke of the spline shaft the compression chamber thus formed between the splined driver and the sleeve end would be filled in part with compressed gas which would then serve to return the parts to non-firing condition wherein action of the safety pin 40 in response to actuation of motor 44 could be synchronized to once again cause safety position and permit gas to be expanded out of the end portions of the cylinder. In this case the disk 25 would be collapsible rather than frangible. Apertures 67 of course are formed in the cylindrical sleeve 62 with operation as shown in the embodiment herein.

Obviously many modifications and variations of the present invention are possible in the light of the above teachings. It is therefore to be understood that within the scope of the appended claims the invention may be practiced otherwise than as specifically described.

What is claimed is:

1. A catapult mechanism comprising an elongated barrel, an explosive device disposed within said barrel for generating an explosive force upon initiation thereof, a propulsive device disposed within said barrel in an initial position and rotatable to an armed position, means for rotating said propulsive device from said initial position to said armed position, said propulsive device being movable longitudinally within the barrel by said explosive force only when the propulsive device is in said armed position, a sleeve disposed over the terminal end of said barrel and having an end wall, exhaust ports in said end wall, means on said propulsive device and barrel and cooperating with said exhaust ports for exhausting said explosive force into the atmosphere when the propulsive device is in said initial position and in the event of premature initiation of the explosive device so that the propulsive device remains in said initial position, additional means on said propulsive device for preventing exhaust of said explosive force into the atmosphere so that the entire explosive force is directed against said propulsive device when the propulsive means is in said armed position and upon initiation of said explosive device, a shaft carried by said propulsive device and movable therewith for moving said sleeve a predetermined amount, a platform secured to the barrel near the terminal end thereof for supporting a missile in a launching position, an elongated slot formed in said platform, and a launching finger carried by said sleeve and extending through said slot in engagement with the missile for forcibly ejecting the missile from the platform as the sleeve is moved said predetermined amount by said shaft.

2. A catapult mechanism comprising a cylindrical barrel member, an explosive device disposed within said barrel in an initial position and rotatable to an armed position, said propulsive device being movable longitudinally within the barrel when the propulsive device is in said armed position by said pressure, a cylindrical element slidably disposed over the barrel and having an end wall normally in engagement with the terminal end of the barrel, a plurality of ports in said end wall, port means in said propulsive device and barrel and cooperating with said ports in said sleeve when the propulsive device is in said initial position for exhausting said pressure into the atmosphere in the event of premature initiation of the explosive device so that the propulsive device remains in said initial position, additional means on the propulsive device blocking said port means in said barrel member for preventing exhaust of said pressure into the atmosphere when the propulsive means is in said armed position so that the entire pressure is directed against said propulsive device upon initiation of said explosive device, means connecting said cylindrical element to the propulsive device for movement therewith, missile supporting means secured to said barrel member near one end thereof for supporting a missile in a launching position, missile engaging means carried by said sleeve in engagement with the missile for forcibly ejecting the missile from said supporting means in response to movement of the cylindrical element by said connecting means, and means centrally disposed in said support through which said missile engaging means extends for engagement with said missile.

3. A gun-catapult mechanism comprising a cylindrical barrel, an explosive charge disposed within said barrel member, an explosive actuated device adjacent said explosive charge and mechanically rotated from an initial position to an armed position, said device being movable longitudinally through said barrel member under explosive forces when the device is in said armed position and upon initiation of the explosive charge, a shaft carried by said device and movable therewith, a sleeve carried by said shaft and disposed over the end portion of the barrel member and movable by said shaft as the shaft is actuated by said device, an end wall on the sleeve and having vent means therein, complementary vent means in the device and barrel member and co-operating with the vent means in said end wall for venting said barrel member so that displacement of the device will not occur when the device is in said initial position and upon premature initiation of said explosive charge, means on said device and cooperating with said vent means in the barrel member for preventing venting of the barrel member so that the entire explosive forces are directed against the device to effect said longitudinal movement thereof when the device is in said armed position, missile supporting means carried by said barrel member for supporting a missile in a launching position, and means on said sleeve in engagement with the missile for effecting launching of the missile as the explosive actuated device is moved longitudinally through the barrel member and the sleeve is forcibly moved by said shaft.

4. A gun-catapult mechanism comprising a cylindrical barrel having an explosive charge therein, an explosive actuated device disposed within said barrel and rotatable from an initial position to an armed position and movable longitudinally along the barrel by expanding gases upon initiation of said explosive charge, a longitudinally movable sleeve carried by said device and normally disposed over the terminal end of the barrel and movable by said device only when the device is in said armed position, vent means in said barrel, complementary vent means in said sleeve in communication with said vent means in the barrel and the atmosphere for venting the gases in the event of premature initiation of the explosive charge so that premature movement of the device and the sleeve is prevented, a platform carried by the barrel at the terminal end thereof for supporting a missile in a launching position, an elongated longitudinally disposed slot formed in said platform, a missile ejecting finger carried by said sleeve and extending through said slot in engagement with the missile for forcibly ejecting the missile from the platform as the sleeve is forcibly moved by the explosive actuated device during said longitudinal movement thereof along the barrel.

References Cited in the file of this patent
UNITED STATES PATENTS 1,799,366     Heinkel _____ Apr. 7, 1931